May 15, 1956  B. M. OSOJNAK  2,745,659
SINTERING MACHINE
Filed March 28, 1955  4 Sheets-Sheet 3

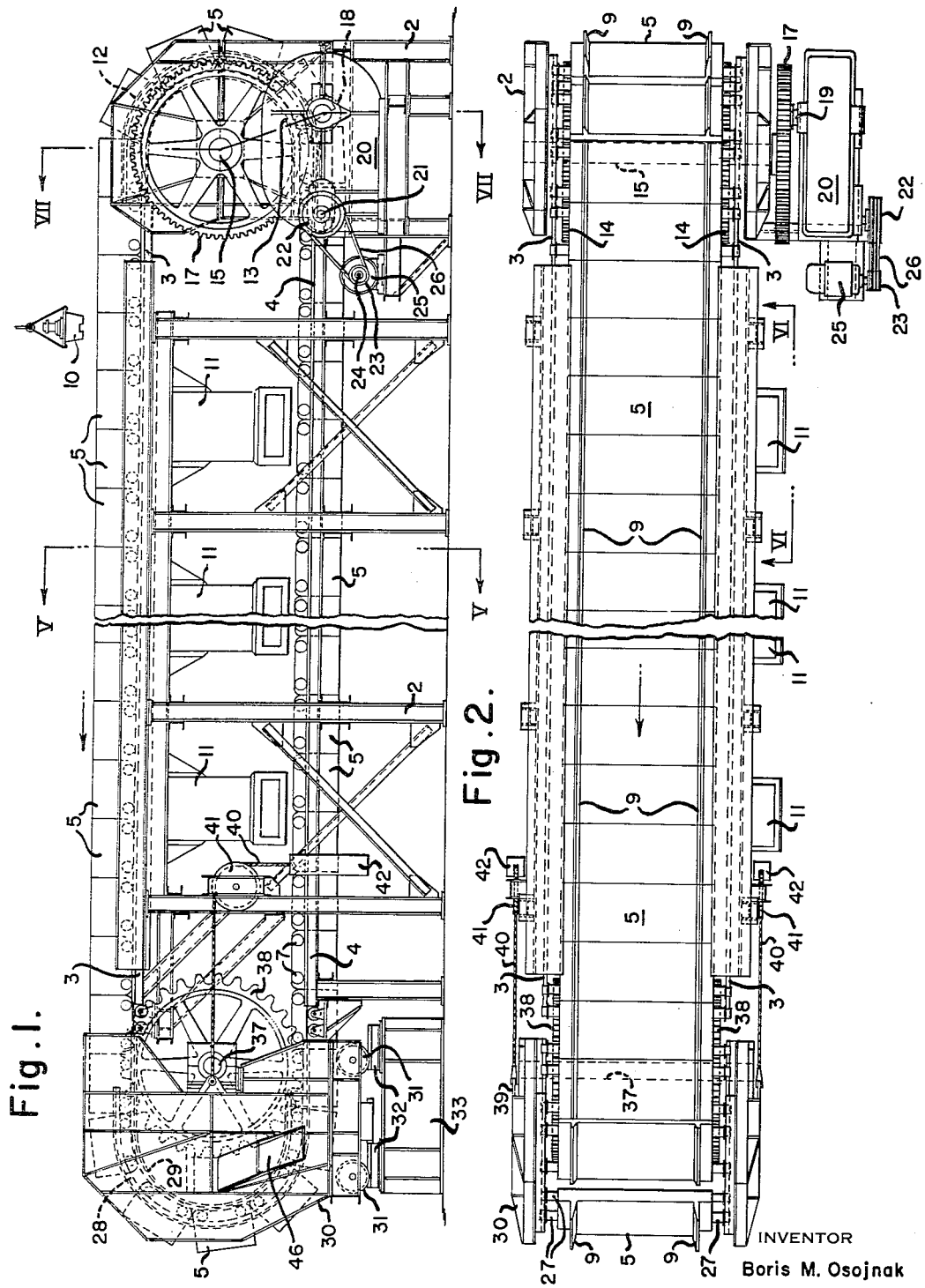

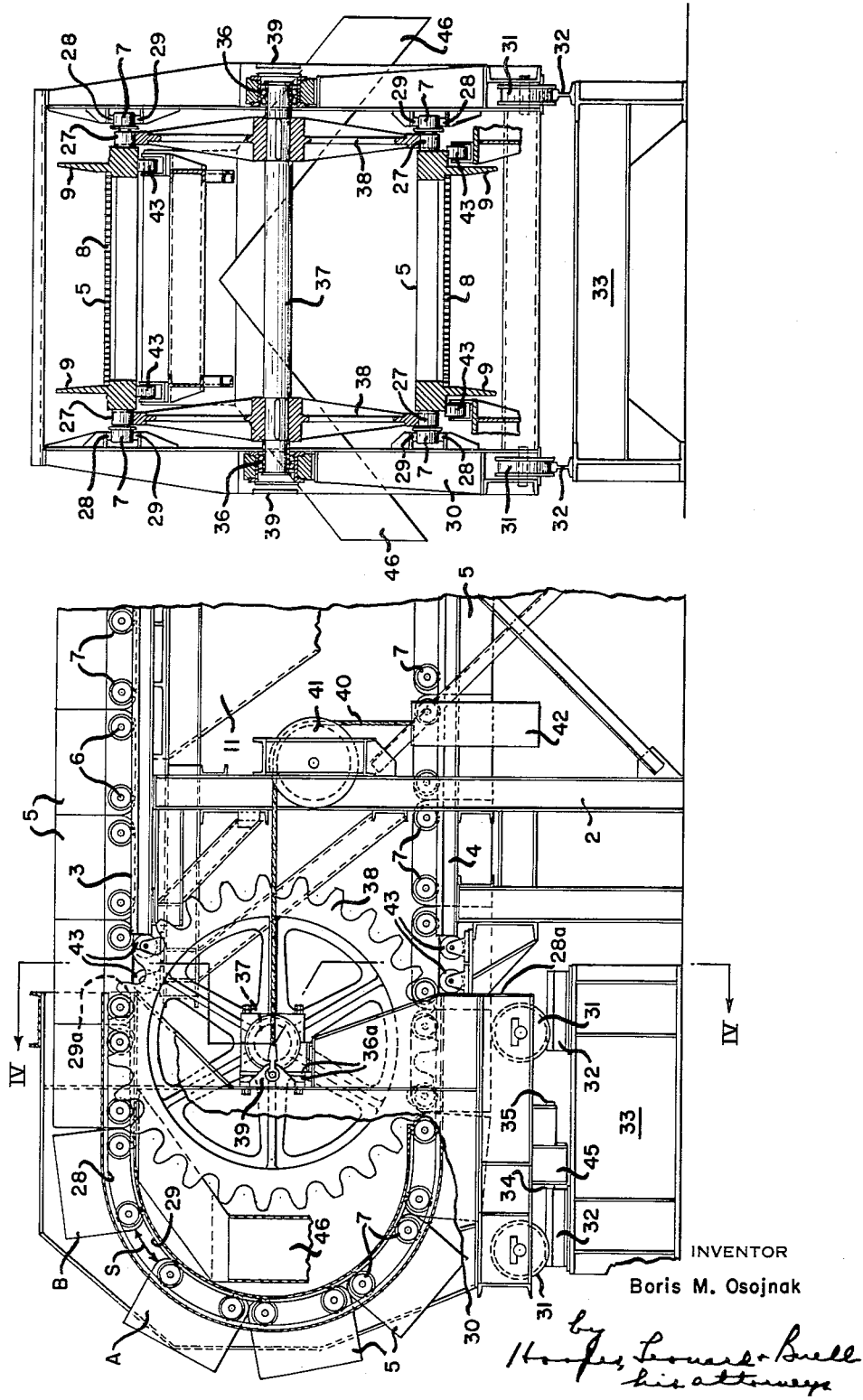

INVENTOR
Boris M. Osojnak

United States Patent Office 2,745,659
Patented May 15, 1956

2,745,659

SINTERING MACHINE

Boris M. Osojnak, Pittsburgh, Pa., assignor to Heyl & Patterson, Inc., Pittsburgh, Pa., a corporation of Pennsylvania Application March 28, 1955, Serial No. 497,045

14 Claims. (Cl. 266—21)

This invention relates to sintering machines, particularly sintering machines in which pallets move in succession in a continuous closed path in a reach of which the pallets are right side up and contain material being sintered and in a return reach of which the pallets are upside down and empty. At an end of the sintering machine the pallets are turned from right side up to upside down position and also are subjected to impact to dislodge therefrom the sintered material. The impact is brought about through movement of the pallets by gravity, each pallet leaving the upper reach of the sintering machine moving generally downwardly due to gravity and having its downward movement abruptly stopped by striking against a pallet which had preceded it. Preferably the turning of each pallet from right side up to upside down position is accomplished simultaneously with the downward movement of the pallet, normally in a generally semi-circularly shaped path or portion of the pallet guideway. For many years pallets have been handled in sintering machines in the manner which I have described.

A sintering machine may contain a large number of pallets, for example, fifty to one hundred. The machine may be elongated in the horizontal direction, the pallets moving one way generally horizontally in the upper reach of the machine and the other way generally horizontally in the lower reach of the machine. The pallets may be right side up in the upper reach and upside down in the lower reach. In such case the sintering is effected in the upper reach. Those skilled in the art are fully conversant with the manner of feeding to the pallets the material to be sintered and the procedure for effecting the sintering. Since the present invention is concerned only with the movement of the pallets and not with the sintering operation per se the details of the sintering operation will not be described.

Means are provided for moving the pallets in the endless path above described which is defined by guiding means in the sintering machine. The means for moving the pallets engage the pallets successively as they move past such means and push each pallet forward. The pallets thus push one another through the sintering machine. However, the guideway of the sintering machine is somewhat longer than the total dimension of the pallets along the guideway, the difference preferably being of the order of inches, perhaps eight to twelve or fifteen inches. Thus as each pallet which has traversed the upper reach of the machine reaches the end of the upper reach and is free to move generally downwardly by gravity it moves downwardly through a distance equal to the difference between the length of the closed pallet guideway and the total dimension of the pallets along the guideway. Each pallet moves downwardly by gravity until it strikes the next preceding pallet which had moved downwardly just ahead of it. The striking of each pallet against the next preceding pallet imparts an impact to both which loosens the sintered material to enable that material to fall out of the pallets. At the time of impact a pallet may be substantially on its side or at least approaching that position so that much of the sintered material may be ejected from the pallet at the moment of impact. As the pallet continues its movement along the guideway it very shortly assumes a completely inverted position so that any loosened sintered material which was not ejected at the moment of impact may easily fall out.

As each pallet strikes the next preceding pallet in downward movement due to gravity as above described the impact tends to deform both pallets, the ultimate effect being a shortening of the pallets in the direction of the guideway. Thus during continued use of a sintering machine the difference between the length of the guideway and the total dimension of the pallets along the guideway tends continually to increase. Heretofore as such difference has increased the distance through which each pallet has dropped at the discharge end of the machine has increased and as that distance has increased the magnitude of the impact has likewise increased and the shortening effect upon the pallets has become increasingly greater. Additional pallets have been inserted into the line of pallets in the sintering machine to reduce the gap. However, before an additional pallet has been introduced the difference between the length of the guideway and the total dimension of the pallets along the guideway has become undesirably great with the consequence above explained.

I provide for automatically maintaining substantially constant the difference between the length of the pallet guideway in a sintering machine and the total dimension of the pallets along the guideway so that the pallet drop remains substantially constant at a desired distance. I accomplish that result by automatically shortening the effective length of the guideway substantially in proportion to the shortening of the total dimension of the pallets along the guideway. Thus at the discharge end of the machine the distance between each pallet just before it moves downwardly by gravity and the next preceding pallet is substantially constant. When the guideway has been shortened to a predetermined or desired extent the operator of the machine lengthens the guideway preferably by a distance equal to the dimension along the guideway of one pallet and at the same time inserts one additional pallet, thus continuing to maintain substantially constant the difference between the length of the guideway and the total dimension of the pallets along the guideway and hence maintaining substantially constant the drop of each pallet at the discharge end of the machine.

I provide a sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway and means adapted to engage pallets to advance the pallets in the guideway. I provide means connected and movable with the movable end portion of the guideway engaging pallets in the upper and lower reaches of the guideway during operation of the machine to maintain through transmission to the pallets of the force exerted against the separately mounted end portion of the guideway a continuous succession of pallets in contact with one another from said means along the upper and lower reaches and the opposite end of the guideway despite reduction of the dimension of the pallets parallel to the direction of movement of the pallets due to use and means supplying pallet advancing force to advance the pallets in the guideway. The pallet engaging means also partakes of movement with the pallets while transmitting the force thereto.

In a preferred form of sintering machine I provide mounting means connected and movable with the movable end portion of the guideway and sprocket means rotatably mounted on the mounting means engaging pallets in the upper and lower reaches of the guideway during operation of the machine to maintain through transmission of the force to the pallets a continuous succession of pallets in contact with one another from the sprocket means along the upper and lower reaches and the opposite end of the guideway. The sprocket means also turns to move with the pallets while transmitting the force thereto.

The means supplying pallet advancing force to advance the pallets in the guideway may be separate from the means exerting force against the end portion of the guideway urging it toward the remainder of the guideway or, alternatively, may act through a portion of such means. The means supplying pallet advancing force may be adjacent the end of the guideway opposite the separately mounted end portion of the guideway. Sprocket means identical with or separate from the sprocket means above referred to may supply the pallet advancing force. The sprocket means applying the pallet advancing force may be adjacent the end of the guideway opposite the end at which the separately mounted end portion of the guideway is disposed.

The pallets may have axles and a shaft may be connected and movable with the movable end portion of the guideway, a sprocket being carried by the shaft which has teeth engaging axles of the pallets in the upper and lower reaches of the guideway. Alternatively, the sprocket may engage portions of the pallets other than the axles.

The separately mounted end portion of the guideway may be in spaced relation to the remainder of the guideway and pallet supporting means may be provided in the space between that end portion of the guideway and the remainder of the guideway to support pallets moving therebetween.

I may provide a plurality of devices connected and movable with the movable end portion of the guideway respectively engaging pallets at transversely spaced portions thereof in the upper and lower reaches of the guideway. The devices may be sprockets; I prefer to employ two sprockets, one at each side of the center line of the guideway. The two sprockets preferably operate in unison by either being connected together and rotating upon a stationary shaft or being fastened to a rotatable shaft. I prefer to employ sprockets whose diameter is substantially equal to the distance between the upper and lower reaches of the guideway so that the same sprockets engage the pallets in the upper reach of the guideway as engage the pallets in the lower reach of the guideway. Thus all of the pallets in the sintering machine along the upper and lower reaches of the guideway and at the opposite end thereof are maintained solidly in contact with one another by the sprockets. If desired, smaller sprockets may be used, one or more sprockets engaging the pallets at the upper reach of the guideway and one or more other sprockets engaging the pallets at the lower reach of the guideway, the upper and lower sprockets being geared together so that their action on the pallets is equivalent to the action of a single sprocket or a plurality of coaxial sprockets acting together and whose diameter is substantially equal to the distance between the upper and lower reaches of the guideway.

While I prefer to transmit the pallet advancing force to the pallets by sprocket means at the end of the guideway opposite the separately mounted end portion thereof it is possible to apply the pallet advancing force through the sprocket means at the separately mounted end portion of the guideway and eliminate the need for any sprocket means at all at the opposite end of the guideway.

The means exerting force against the separately mounted end portion of the guideway urging it toward the remainder of the guideway may take various forms. I prefer to employ means including counterweight means for exerting such force but other means such as spring means, fluid pressure means, etc., may be employed.

I preferably provide means limiting the movement of the separately mounted end portion of the guideway toward the remainder of the guideway. When such movement limiting means becomes effective the separately mounted end portion of the guideway may be moved away from the remainder of the guideway against the action of the counterweight means or other means applying force to the separately mounted end portion of the guideway urging it toward the remainder of the guideway and an additional pallet may be inserted. Movement of the separately mounted end portion of the guideway away from the remainder of the guideway may be effected by any suitable means, such, for example, as jack means which may be inserted between the separately mounted end portion of the guideway and the remainder of the guideway to act against opposed portions thereof provided for the purpose.

The counterweight means and the jack means may be combined into a single unit providing for the application of both pushing and pulling forces.

The separately mounted end portion of the guideway may be mounted on tracks, wheels or skids or through swinging links so long as it can move back and forth toward and away from the remainder of the guideway through a distance of approximately a foot.

The pallets may as above mentioned be provided with axles and in that case wheels may be carried by the axles enabling the pallets to move antifrictionwise along the guideway. Alternatively for antifriction movement of the pallets along the guideway the guideway may comprise wheels or rollers mounted to turn about stationary axes and to bear against and support portions of the pallets. In other words, when rolling support of the pallets is desired the wheels or rollers may be either on the pallets or on the guideway.

Other details, objects and advantages of the invention will become apparent as the following description of a present preferred embodiment thereof proceeds.

In the accompanying drawings I have shown a present preferred embodiment of the invention in which Figure 1 is an elevational view of a sintering machine, the figure being somewhat diagrammatic, omitting some conventional portions of the machine not constituting the invention and with a portion cut away;

Figure 2 is a plan view of the sintering machine shown in Figure 1, this figure also being somewhat diagrammatic, omitting some conventional portions of the machine not constituting the invention and with a portion cut away;

Figure 3 is an enlarged fragmentary view partly in elevation and partly in vertical cross section of the left hand end of the sintering machine viewing Figure 1;

Figure 4 is a cross-sectional view taken on the line IV—IV of Figure 3;

Figure 6:
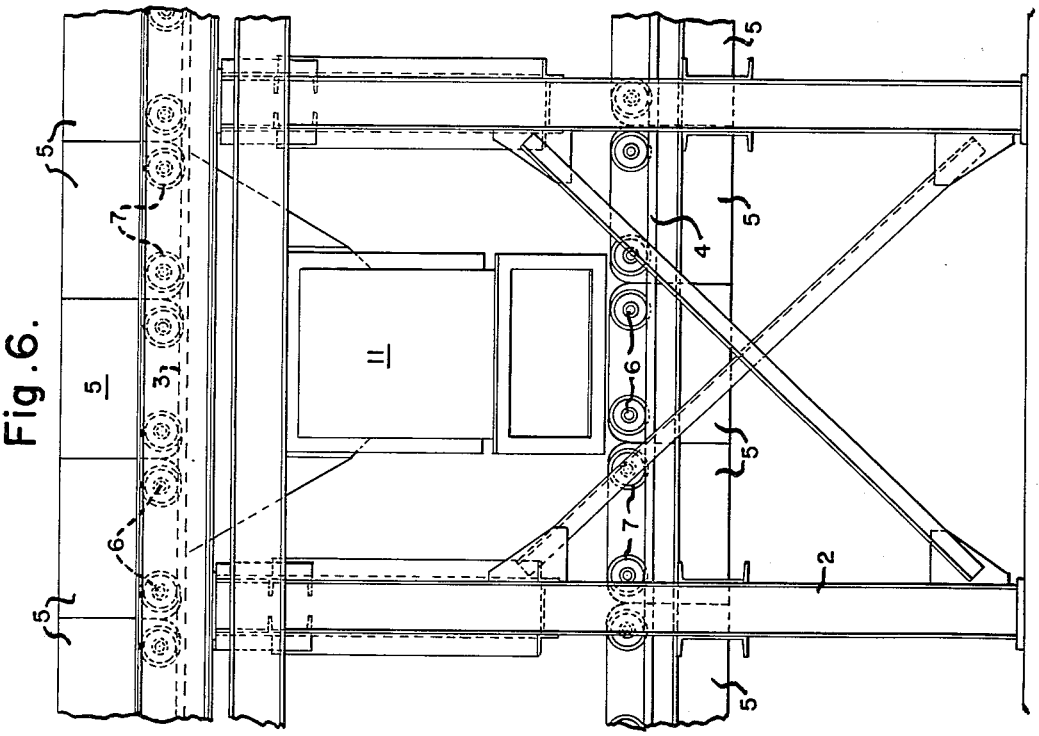
Figure 6 is an enlarged fragmentary elevational view taken on the line VI—VI of Figure 2.
Figure 5:
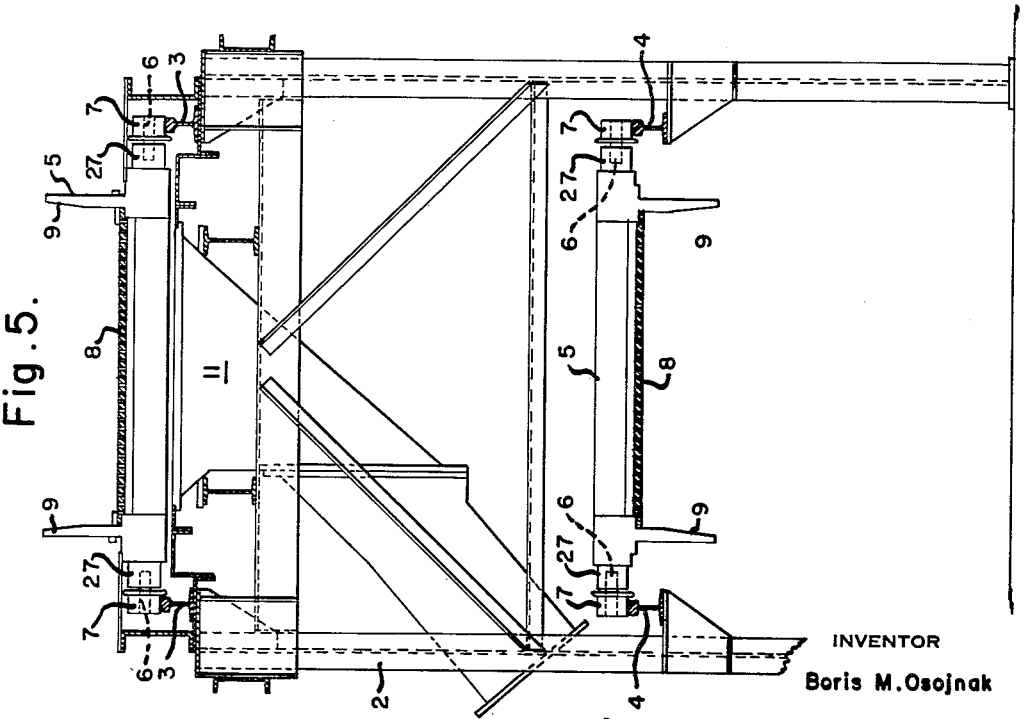
Figure 5 is an enlarged cross-sectional view taken on the line V—V of Figure 1.

Referring now more particularly to the drawings, the sintering machine comprises a stationary supporting structure designated generally by reference numeral 2 carrying a horizontal upper track 3 and a horizontal lower track 4 directly below the track 3 as shown in Figure 5. The tracks 3 and 4 support a series of pallets 5 each of which comprises two horizontal axles 6. Each axle 6 carries a wheel 7 at each end thereof, the wheels 7 riding on the tracks 3 and 4 when the pallets are moving horizontally in the central portion of the sintering machine. The pallets may be of conventional form, having grate bars 8 forming their bottoms and having upright walls 9. As the pallets move from right to left viewing Figures 1 and 2 upon the upper track 3 they are in upright position and contain material being sintered and as the pallets move from left to right upon the lower track 4 they are in inverted position and empty. Means forming no part of the invention are provided for feeding material to be sintered to the pallets and receiving the sintered material dumped out by the pallets. The material to be sintered is introduced into the pallets at the right-hand end of the machine viewing Figure 1 as the pallets begin their movement to the left upon the upper track 3. An ignition unit 10 is provided to ignite the material in the pallets being sintered as known to those skilled in the art and air is drawn downwardly through the pallets and the material being sintered on the upper track 3 by any suitable means known to those skilled in the art. Windboxes 11 for that purpose are shown in Figure 1.

At the right-hand end of the machine viewing Figure 1 the pallets move in the counterclockwise direction in a semi-circular path between an outer curved track 12 and an inner curved track 13. The pallet wheels 7 begin to ride up on the outer track 12 and after they pass the vertical center of the curved tracks 12 and 13 they ride upon the inner track 13. During the movement of the pallets through the curved tracks 12 and 13 the pallets are inverted so that although they are upside down as they enter the curved tracks they are right side up as they leave the curved tracks. The lower portion of the curved track 12 is in line with the lower track 4 and the upper portion of the curved track 13 is in line with the upper track 3.

The force applied to the pallets to lift them up through the curved tracks 12 and 13 is in the form of machine shown in the drawings supplied by two sprockets 14 fixedly mounted on a horizontal shaft 15 whose axis is at the center of curvature of the semi-circular curved tracks 12 and 13. The shaft 15 is mounted for rotation in opposed bearings 16 carried by the stationary supporting structure 2. The shaft 15 projects to the left viewing Figure 7 beyond the left-hand bearing 16 where there is keyed to it a spur gear 17. The spur gear 17 is driven by a pinion 18 in mesh therewith, the pinion 18 being fixed to the output shaft 19 of a gear reducer 20. The input shaft of the gear reducer 20 is shown at 21 and has keyed thereto a series of V-belt pulleys 22. Coplanar with the pulleys 22 is a corresponding series of V-belt pulleys 23 fixed to the shaft 24 of a driving motor 25. A series of V-belts 26 are trained about the pulleys 22 and 23. By the mechanism described the motor 25 turns in the counterclockwise direction viewing Figure 1 the shaft 15 and consequently the two sprockets 14 fixed to that shaft. The sprockets 14 have circumferentially spaced teeth providing therebetween generally semi-circular pockets adapted to snugly receive bearing portions 27 of the axles 6, the bearing portions 27 being disposed immediately inside the wheels 7. Thus while the wheels 7 ride between the curved tracks 12 and 13 to positively guide the pallets in their rising and inverting movements they are pushed upwardly in the tracks 12 and 13 by the driven sprockets 14.

The pallets push one another along the tracks 3 and 4 which form the horizontal reaches of a closed pallet guideway. The right-hand end of the closed pallet guideway is formed by the tracks 12 and 13. The left-hand end of the closed pallet guideway is formed by semicircular curved outer and inner tracks 28 and 29 shown in Figures 1 and 3. In the form of machine shown all of the tracks 12, 13, 28 and 29 have short horizontal reaches at their respective ends so that those tracks are in fact in the shape of the letter U lying on its side.

The tracks 28 and 29 are mounted upon and carried by a carriage designated generally by reference numeral 30 which is movable longitudinally of the sintering machine, i. e., parallel to the tracks 3 and 4, upon wheels 31 which ride upon tracks 32 mounted upon a stationary pedestal 33. The longitudinal movement of the carriage 30 is relatively short, being of the order of twelve to fifteen or eighteen inches. Movement of the carriage 30 toward the left viewing Figure 3 is limited by a stop 34 carried by the carriage which engages the right-hand extremity of the left-hand track 32 and movement of the carriage 30 toward the right is limited by a stop 35 carried by the carriage which engages the left-hand extremity of the right-hand track 32.

Mounted in the carriage 30 are aligned bearings 36 in which is freely mounted for rotation a shaft 37 to which are keyed two sprockets 38 which are respectively in longitudinal alignment with the sprockets 14 and engage the bearing portions 27 of the axles 6 of the pallets in the same way. The sprockets 38, however, are not driven but are maintained in synchronism with each other by reason of the fact they they are both keyed to the same shaft 37, which shaft is freely rotatable in the bearings 36.

The carriage 30 has mounted thereon at each side a lug 39, and a length of wire rope or other elongated flexible member 40 is connected to each lug 39 and extends therefrom generally horizontally toward the right viewing Figure 3 and about a pulley 41 rotatably mounted in the stationary supporting structure 2. Each of the wire ropes 40 carries a counterweight 42 at its end. The counterweights 42 continuously urge the carriage 30 to move toward the right viewing Figure 3 upon the tracks 32.

The carriage 30 is shown in Figure 3 in its extreme left-hand position with the stop 34 against the right-hand extremity of the left-hand track 32. When the carriage is in that position the right-hand extremities 28a and 29a, respectively of the tracks 28 and 29 are spaced from the left-hand extremities of the tracks 4 and 3 as shown in the figure. Freely turning rollers 43 are mounted upon the stationary supporting structure 2 to the left of the left-hand ends of the tracks 3 and 4 as shown in Figure 3 to support the pallets as they move in the upper reach of the guideway from the tracks 3 to the tracks 29 and as they move in the lower reach of the guideway from the tracks 28 to the tracks 4. The rollers 43 engage portions 44 of the pallets as shown in Figure 4. When the carriage 30 is in its extreme right-hand position viewing Figure 3 there is no substantial gap between the tracks 3 and 4 on the one hand and the tracks 28 and 29 on the other hand and at that time the rollers 43 are unnecessary, but when the carriage 30 is to the left as shown in Figure 3 it is necessary to provide some means to support the pallets as they move across the gaps between the tracks 3 and 4 on the one hand and the tracks 28 and 29 on the other hand.

Figure 7:
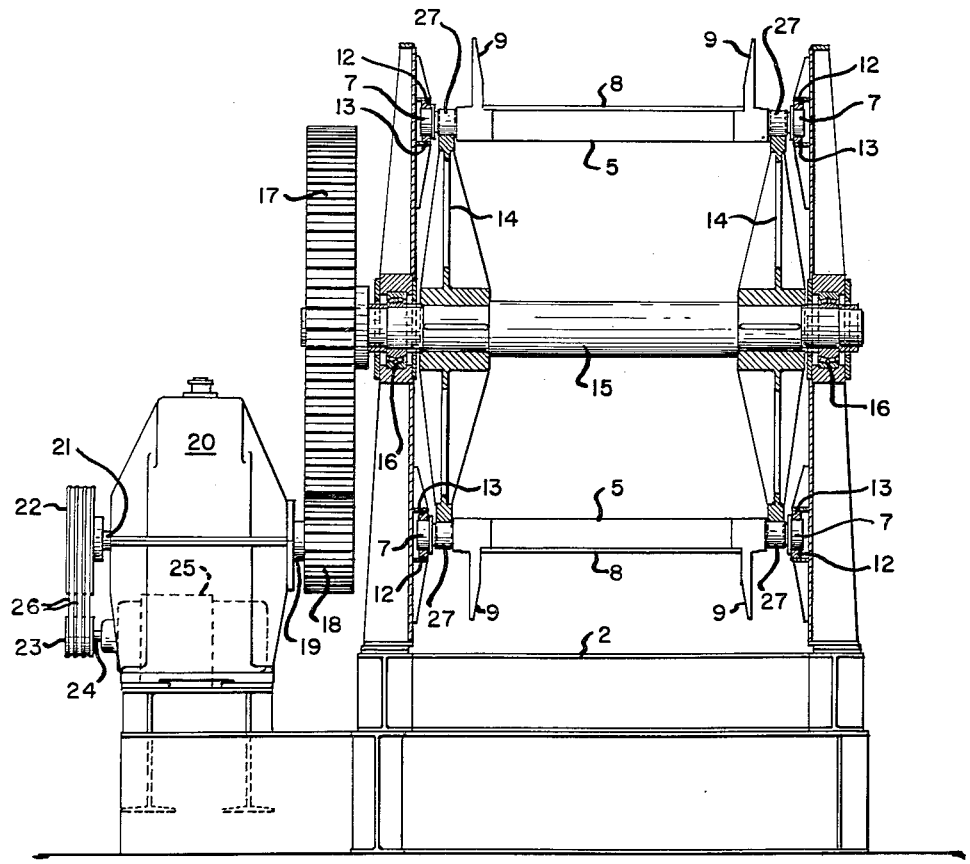
Figure 7 is an enlarged transverse cross-sectional view taken on the line VII—VII of Figure 1.

When preparing to place the sintering machine in operation the carriage 30 is moved to substantially its extreme left-hand position as shown in Figure 3 and the closed pallet guideway is filled solidly with pallets from the position of the pallet designated A in Figure 3 down around the tracks 28 and 29, across the bottom rollers 43, along the bottom track 4, up around the tracks 12 and 13, along the track 3, across the top rollers 43 and to the position of the pallet designated B in Figure 3. A space designated S in Figure 3 separates the pallets A and B; except for the space S all of the pallets are in contact with one another. The bearing portions 27 of the axles 6 of pallets at the top and at the bottom of the sprockets 14 and 38 are disposed in the pockets between the teeth of the sprockets as shown in Figure 3. Figures 4 and 7 also show in cross section the bearing portions 27 of axles of pallets in the pockets of the sprockets. As above explained the sprockets 38 are keyed to the shaft 37 which is mounted for free rotation in the bearings 36 mounted in the carriage 30. Hence the counterweights 42 press the sprockets 38 toward the right viewing Figure 3. But since all of the pallets to the right of the sprockets 38 are disposed in contact with one another the pallets resist the tendency of the counterweights to move the carriage 30 and hence the sprockets 38 toward the right. The sprockets 14 are driven by the motor 25 as above explained and move the pallets in the counterclockwise direction at the right-hand end of the guideway. The pallets moving toward the left upon the track 3 turn the sprockets 38 in the counterclockwise direction viewing Figure 3, the sprockets 38 at all times maintaining in solid contact with one another all of the pallets to the right of the sprockets 38 in the sintering machine. As each pallet reaches the position B of Figure 3 it is free because of the space between it and the preceding pallet A to move downwardly by gravity through the distance S until it strikes the preceding pallet A. The distance S may be any desired distance, it being shown as being about nine inches in the embodiment of the invention shown in the drawings. As each pallet moves from the position B downwardly to strike the preceding pallet in the position A the sintered material in the pallet is by the impact loosened from the grate bars 8 and substantially all of the sintered material is discharged from each pallet during the time the pallet is moving down and being inverted between the tracks 28 and 29.

The impact of the pallets against one another due to the downward movement of each pallet by gravity through the distance S results in some foreshortening of the pallets or reduction of their dimension in the direction of the closed pallet guideway in the sintering machine. Such reduction is, of course, very gradual but it is progressive and substantial as the machine continues in operation. As the dimension of the pallets in the direction of the guideway is progressively reduced the carriage 30 moves slowly toward the right under the action of the counterweights 42. In other words, the effective length of the guideway is shortened as the dimension of the pallets along the guideway shortens so that the distance S remains approximately constant during operation of the sintering machine. The distance S increases slightly but negligibly since it is determined by the dimension along the guideway of only six or seven pallets out of a total number of perhaps fifty or one hundred pallets in the sintering machine. An increase of the distance S to twelve inches or even somewhat more is not detrimental. That distance can never increase to such an extent that the pallets in moving from the position B to the position A will move through an undesirably great distance. Initially the distance S is set by means of shims 36a against the supports for bearings 36.

When the carriage 30 reaches approximately the right-hand end of its movement, i. e., when the stop 35 comes approximately into contact with the left-hand end of the right-hand track 32, the carriage 30 is moved back to the left to its starting position and an additional pallet is inserted to the right of the carriage thus restoring the condition existing at the beginning of operation except that there is one more pallet in the machine than at the beginning. The carriage 30 may be moved toward the left against the action of the counterweights 42 by interposing a jack between the right-hand track 32 and an abutment 45 on the carriage. The carriage may be held in position by the jack until the additional pallet is inserted into the guideway whereupon the jack may be released to allow the counterweights 42 to press the sprockets 38 against the pallets as above explained.

A spill chute 46 may be provided for receiving sintered material which spills between the grate bars 8 and between the pallets. However, no attempt has been made to show the means for handling the material being sintered since such means may be conventional. We have purposely omitted from the drawings elements not concerned with the improvement which is the subject of the present invention and which has to do with the control of the pallets.

As mentioned above, the drive may be applied to the shaft 37 instead of to the shaft 15 but we find it somewhat more satisfactory to apply the drive to the shaft 15 since then the drive can be stationarily mounted. If the drive is applied to the shaft 37 it must be mounted on the carriage 30. If the drive is applied to the shaft 37 the entire mechanism at the right-hand end of the sintering machine except for the tracks 13 and 14 may be dispensed with. The shaft 15 and the sprockets 14 will then have no useful function and need not be employed. The counterweights 42 may be replaced by any equivalent means such as springs, fluid pressure means, etc. The rollers 43 may be replaced by rails or skids or any other suitable means supporting the pallets as they move across the gap between the tracks 3 and 4 on the one hand and the tracks 28 and 29 on the other hand. The wheels 31 may be replaced by sliding members or the carriage 30 may be mounted upon swinging links or otherwise, the only essential being that the carriage be movable generally horizontally toward and away from the remainder of the sintering machine. The tracks for guiding the pallets may be made of rollers instead of being conventional tracks as shown and the pallets may have means cooperating with the rollers whereby the pallets are guided in precisely the same way as in the embodiment of the invention shown in the drawings. In place of the sprockets 38 there may be provided smaller upper and lower sprockets geared together or other equivalent means which will press against the pallets toward the right from such means while permitting movement of the pallets along the guideway as above explained. Moreover, while I have shown and described a present preferred embodiment of the invention and certain modifications thereof the invention is not limited thereto but may be otherwise variously embodied within the scope of the following claims.

I claim:

1. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway and means adapted to engage pallets to advance the pallets in the guideway.

2. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use and means supplying pallet advancing force to advance the pallets in the guideway.

3. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use, said means also partaking of movement with the pallets while transmitting said force thereto, and means supplying pallet advancing force to advance the pallets in the guideway.

4. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, mounting means connected and movable with the movable end portion of the guideway, sprocket means rotatably mounted on the mounting means engaging pallets in the upper and lower reaches of the guideway during operation of the machine to maintain through transmission of said force to the pallets a continuous succession of pallets in contact with one another from the sprocket means along the upper and lower reaches and the opposite end of the guideway despite reduction of the dimension of the pallets parallel to the direction of movement of the pallets due to use, the sprocket means also turning to move with the pallets while transmitting said force thereto, and means supplying pallet advancing force to advance the pallets in the guideway.

5. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use, said means also partaking of movement with the pallets while transmitting said force thereto, and means separate from said means supplying pallet advancing force to advance the pallets in the guideway.

6. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use, said means also partaking of movement with the pallets while transmitting said force thereto, and means adjacent the opposite end of the guideway supplying pallet advancing force to advance the pallets in the guideway.

7. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, mounting means connected and movable with the movable end portion of the guideway, sprocket means rotatably mounted on the mounting means engaging pallets in the upper and lower reaches of the guideway during operation of the machine to maintain through transmission of said force to the pallets a continuous succession of pallets in contact with one another from the sprocket means along the upper and lower reaches and the opposite end of the guideway despite reduction of the dimension of the pallets parallel to the direction of movement of the pallets due to use, the sprocket means also turning to move with the pallets while transmitting said force thereto, and other sprocket means supplying pallet advancing force to advance the pallets in the guideway.

8. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, mounting means connected and movable with the movable end portion of the guideway, sprocket means rotatably mounted on the mounting means engaging pallets in the upper and lower reaches of the guideway during operation of the machine to maintain through transmission of said force to the pallets a continuous succession of pallets in contact with one another from the sprocket means along the upper and lower reaches and the opposite end of the guideway despite reduction of the dimension of the pallets parallel to the direction of movement of the pallets due to use, the sprocket means also turning to move with the pallets while transmitting said force thereto, and sprocket means adjacent the opposite end of the guideway supplying pallet advancing force to advance the pallets in the guideway.

9. A sintering machine comprising a pallet guideway arranged to guide pallets in a closed path in which the pallets move in an upper reach generally in one direction with one side up and in a lower reach generally in the opposite direction with said side down, the pallets having axles, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, a shaft connected and movable with the movable end portion of the guideway, a sprocket carried by the shaft having teeth engaging axles of the pallets in the upper and lower reaches of the guideway during operation of the machine to maintain through transmission of said force to the pallets a continuous succession of pallets in contact with one another from the sprocket along the upper and lower reaches and the opposite end of the guideway despite reduction of the dimension of the pallets parallel to the direction of movement of the pallets due to use, the sprocket also turning to move with the pallets while transmitting said force thereto, and means supplying pallet advancing force to advance the pallets in the guideway.

10. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from and in spaced relation to the remainder of the guideway for movement generally toward and away from the remainder of the guideway, means exerting force against said end portion of the guideway urging it toward the remainder of the guideway, pallet supporting means in the space between said end portion of the guideway and the remainder of the guideway to support pallets moving therebetween, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use, said means also partaking of movement with the pallets while transmitting said force thereto, and means supplying pallet advancing force to advance the pallets in the guideway.

11. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, a plurality of devices connected and movable with the movable end portion of the guideway respectively engaging pallets at transversely spaced portions thereof in the upper and lower reaches of the guideway during operation of the machine to maintain through transmission of said force to the pallets a continuous succession of pallets in contact with one another from said devices along the upper and lower reaches and the opposite end of the guideway despite reduction of the dimension of the pallets parallel to the direction of movement of the pallets due to use, said devices also partaking of movement with the pallets while transmitting said force thereto, and means supplying pallet advancing force to advance the pallets in the guideway.

12. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means including counterweight means exerting force against said end portion of the guideway urging it toward the remainder of the guideway, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use, said means also partaking of movement with the pallets while transmitting said force thereto, and means supplying pallet advancing force to advance the pallets in the guideway.

13. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, means connected and movable with the movable end portion of the guideway engaging pallets in the upper and lower reaches of the guideway during operation of the machine to maintain through transmission of said force to the pallets a continuous succession of pallets in contact with one another from said means along the upper and lower reaches and the opposite end of the guideway despite reduction of the dimension of the pallets parallel to the direction of movement of the pallets due to use, said means also partaking of movement with the pallets while transmitting said force thereto, means supplying pallet advancing force to advance the pallets in the guideway and means limiting the movement of said end portion of the guideway toward the remainder of the guideway.

14. A sintering machine comprising a pallet guideway arranged to guide pallets in a closed path in which the pallets move in an upper reach generally in one direction with one side up and in a lower reach generally in the opposite direction with said side down, the guideway except for one end portion thereof being normally stationarily mounted during operation of the machine, said end portion of the guideway comprising means guiding pallets between the upper and lower reaches and inverting the pallets and being mounted separately from the remainder of the guideway for movement generally toward and away from the remainder of the guideway, means exerting force against said end portion of the guideway urging it toward the remainder of the guideway, a shaft connected and movable with the movable end portion of the guideway, a sprocket carried by the shaft having teeth engaging the pallets in the upper and lower reaches of the guideway during operation of the machine to maintain through transmission of said force to the pallets a continuous succession of pallets in contact with one another from the sprocket along the upper and lower reaches and the opposite end of the guideway despite reduction of the dimension of the pallets parallel to the direction of movement of the pallets due to use, the sprocket also turning to move with the pallets while transmitting said force thereto, and means supplying pallet advancing force to advance the pallets in the guideway.

References Cited in the file of this patent

UNITED STATES PATENTS 1,469,521     Lloyd _____ Oct. 2, 1923